No. 746,799. Patented December 15, 1903.

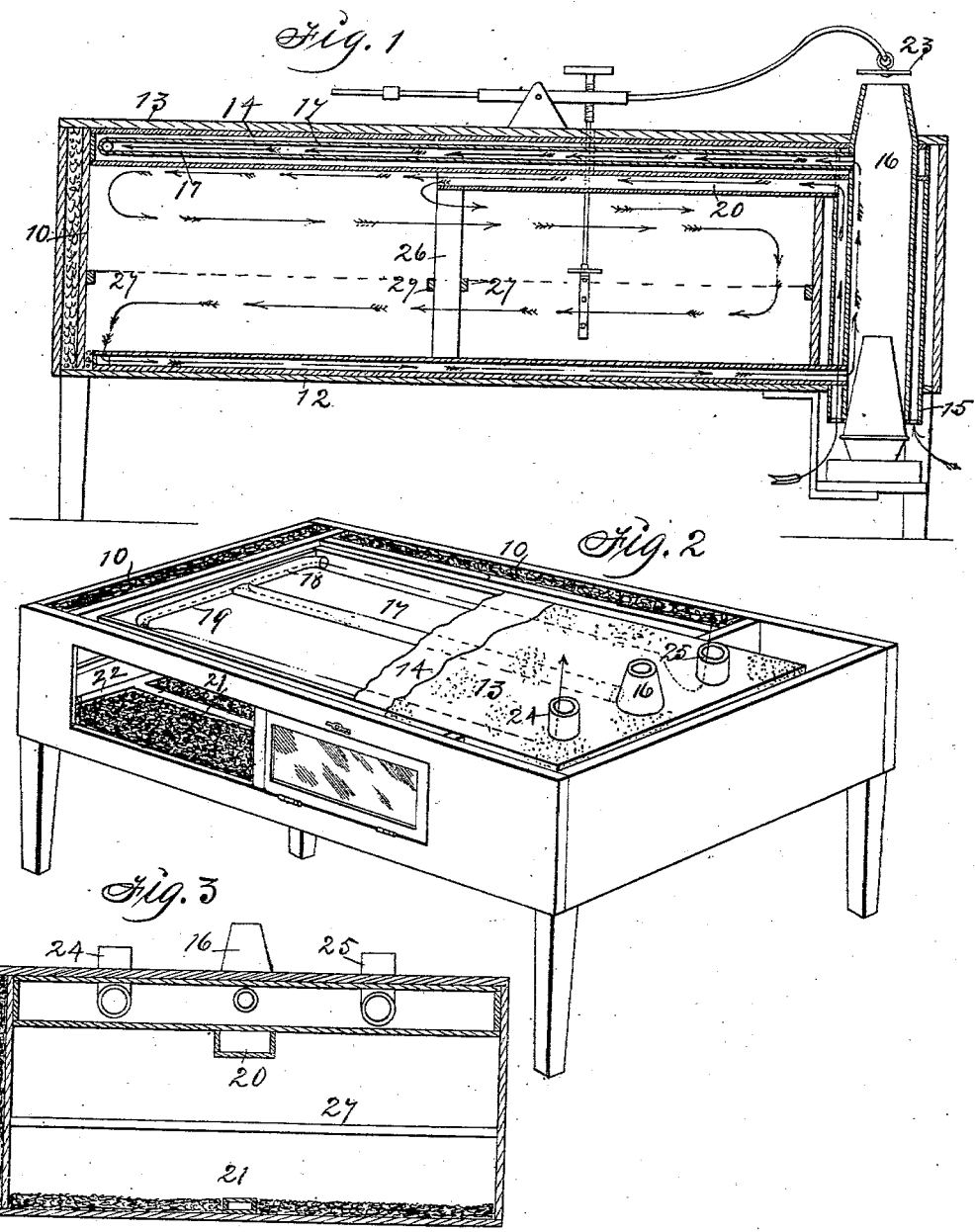

UNITED STATES PATENT OFFICE.

HENRY C. DONOHOE, OF DES MOINES, IOWA.

INCUBATOR.

SPECIFICATION forming part of Letters Patent No. 746,799, dated December 15, 1903.

Application filed March 24, 1903. Serial No. 149,410. (No model.)

*To all whom it may concern:*

Be it known that I, HENRY C. DONOHOE, a citizen of the United States, residing at Des Moines, in the county of Polk and State of Iowa, have invented a new and useful Incubator, of which the following is a specification.

My object is to provide an incubator specially adapted for mingling pure cold air with heated air before it is distributed in the egg and brood chambers as required to maintain a pure heated atmosphere and even temperature in the corners and all parts of the egg and brood chambers; to connect a hot-air chamber and radiator with the top of the egg-chamber for circulating the products of combustion and the exhaust from the egg and brood chambers in the top of the incubator to aid in maintaining a pure air and even temperature in the egg and brood chambers as required for hatching eggs and taking proper care of chicks as they drop from egg-trays upon the floor of the brood-chamber in the bottom of the incubator, and to connect ventilating-tubes with the egg and brood chambers, the combustion-chamber, and the hot-air chamber and radiator in the top of the incubator for conveying the air exhausted from the egg and brood chambers into the hot-air chamber and radiator and from thence to the escape-tubes on top of the incubator.

My invention consists in the construction, arrangement, and combination of parts, as hereinafter set forth, pointed out in my claims, and illustrated in the accompanying drawings, in which—

Figure 1 is a vertical longitudinal sectional view that shows the connection of the hot-air chamber and radiator and the ventilating-tubes with the air-heating chamber and the egg and brood chambers. Fig. 2 is a perspective view from which parts are broken away to show the air distributing and ventilating tubes and their positions relative to each other. Fig. 3 is a transverse sectional view on a line that shows the position of the tube that conveys pure heated air into the egg and brood chambers, the ventilating-tube through which foul air is exhausted at the bottom of the brood-chamber into the combustion-chamber and from thence into the hot-air chamber and radiator in the top and carried off with waste products of combustion through escape-tubes on top of the incubator.

The numeral 10 designates the double wall, 12 the fixed bottom, and 13 the fixed top of the incubator rigidly connected and supported upon legs at the corners. Doorways and doors at the front side are provided for gaining access to the interior as required for moving egg-trays in and out. A sheet-metal hot-air chamber 14, that serves as a radiator, is fixed in the top and an annular air-heating chamber 15 is fixed in one end of the incubator and provided with a central flue 16, into which a lamp-chimney is extended, as shown in Fig. 1. A tube 17 is connected with the flue 16 and extended through the hot-air chamber 14 and terminates in branches 18 and 19, as shown in Fig. 2, for discharging hot air into the end of the hot-air chamber to be distributed therein and to aid by radiation downward in maintaining an evenly warm temperature in all parts of the egg and brood chambers below.

A tube 20 is connected with the annular air-heating chamber 15 and extends to the center of the egg-chamber immediately under the hot-air chamber 14, as shown in Figs. 1 and 3. The bottom of the annular chamber 15 has apertures for supplying cold air to be mingled with the heated air in the annular chamber when the lamp is burning.

A ventilating-tube 21 for aiding the even distribution of warm air in the egg and brood chambers is located on the bottom 12 and is connected with the flue 16 at one end and has lateral extensions 22, that are open at their free ends to admit and convey the foul air from the bottom of the brood-chamber into the flue 16 or into the tube 17 in the hot-air chamber 14 when the top of the flue 16 is closed by means of a cap 23, automatically operated by a thermostat in a common way to escape with the waste products of combustion through tubes 24 and 25, connected with the end of the hot-air chamber 14, as shown in Fig. 3.

A post 26 is fixed in the center of the brood and egg chambers, and cleats 27 are fixed to the post and the inside faces of the double wall, as shown in Fig. 1, for supporting movable egg-trays.

Mineral wool, sheet asbestos, or other suitable non-conductor of heat is placed in the bottom of the brood-chamber, as indicated in Figs. 2 and 3, to aid in keeping the brood-chamber warm for the chicks.

Having thus described the purposes, construction, and operation of my invention, its practical utility will be obvious to persons familiar with the art to which it pertains, and what I claim as new, and desire to secure by Letters Patent, is—

1. In an incubator, a sheet-metal hot-air chamber in the top, an air-heating and radiating chamber at the end, a tube extending from the air-heating chamber from one end to the other and provided with lateral extensions at the free end that are open-ended, discharge-tubes connected with the end of the hot-air chamber connected with the air-heating chamber and a ventilating-tube connected with the lower end of the air-heating chamber and extended over the bottom of an incubator and open at its free end, arranged and combined to operate in the manner set forth for the purposes stated.

2. In an incubator, a sheet-metal hot-air chamber in the top, an air-heating and radiating chamber at the end, a tube extending from the air-heating chamber from one end to the other and provided with lateral extensions at its free end that are open-ended, discharge-tubes connected with the end of the hot-air chamber connected with the air-heating chamber, a ventilating-tube connected with the lower end of the air-heating chamber and extended over the bottom of the incubator and open at its free end and a flue for waste products of combustion extended through the air-heating chamber arranged and combined to operate in the manner set forth for the purposes stated.

3. In an incubator, a double wall having a fixed top and bottom and doorways and doors on one side, an annular air-heating chamber at one end that has apertures at its bottom, an escape-flue in the center of the annular air-heating chamber, a hot-air chamber in the top of the incubator, a tube in the said hot-air chamber communicating with the top portion of the flue in the annular air-heating chamber and extended to the other end of the hot-air chamber and provided with lateral extensions that are open at their free ends, tubes extended upward from the end of the hot-air chamber, a tube connected with the top portion of the annular chamber and extended to the center of the egg-chamber and open at its end, a ventilating-tube connected with the lower end of the flue in the air-heating chamber and extended over the bottom to the other end of the incubator and provided with lateral open-ended extensions, arranged and combined to operate in the manner set forth for the purposes stated.

HENRY C. DONOHOE.

Witnesses:
GEORGE E. DONOHOE,
H. J. DONAHUE.